E. R. WOLCOTT.
ART OF SEPARATING SUSPENDED PARTICLES FROM GASES.
APPLICATION FILED AUG. 27, 1917.
1,383,586.
Patented July 5, 1921.
2 SHEETS—SHEET 2.
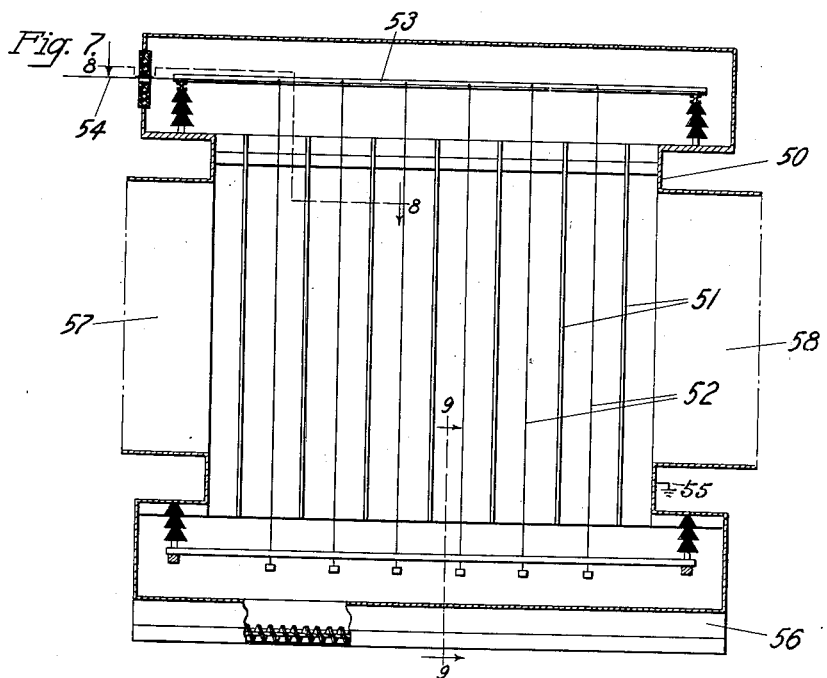
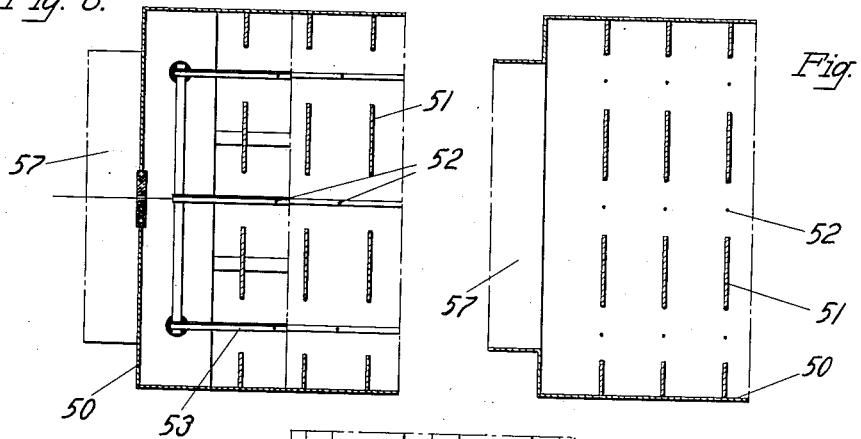
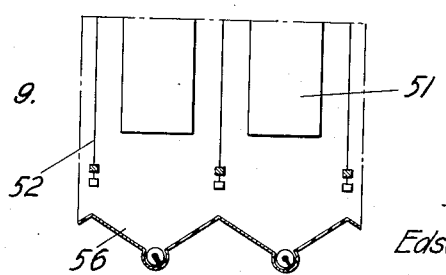
Inventor:
Edson Ray Wolcott
by: Arthur P. Knight
his Attorney.

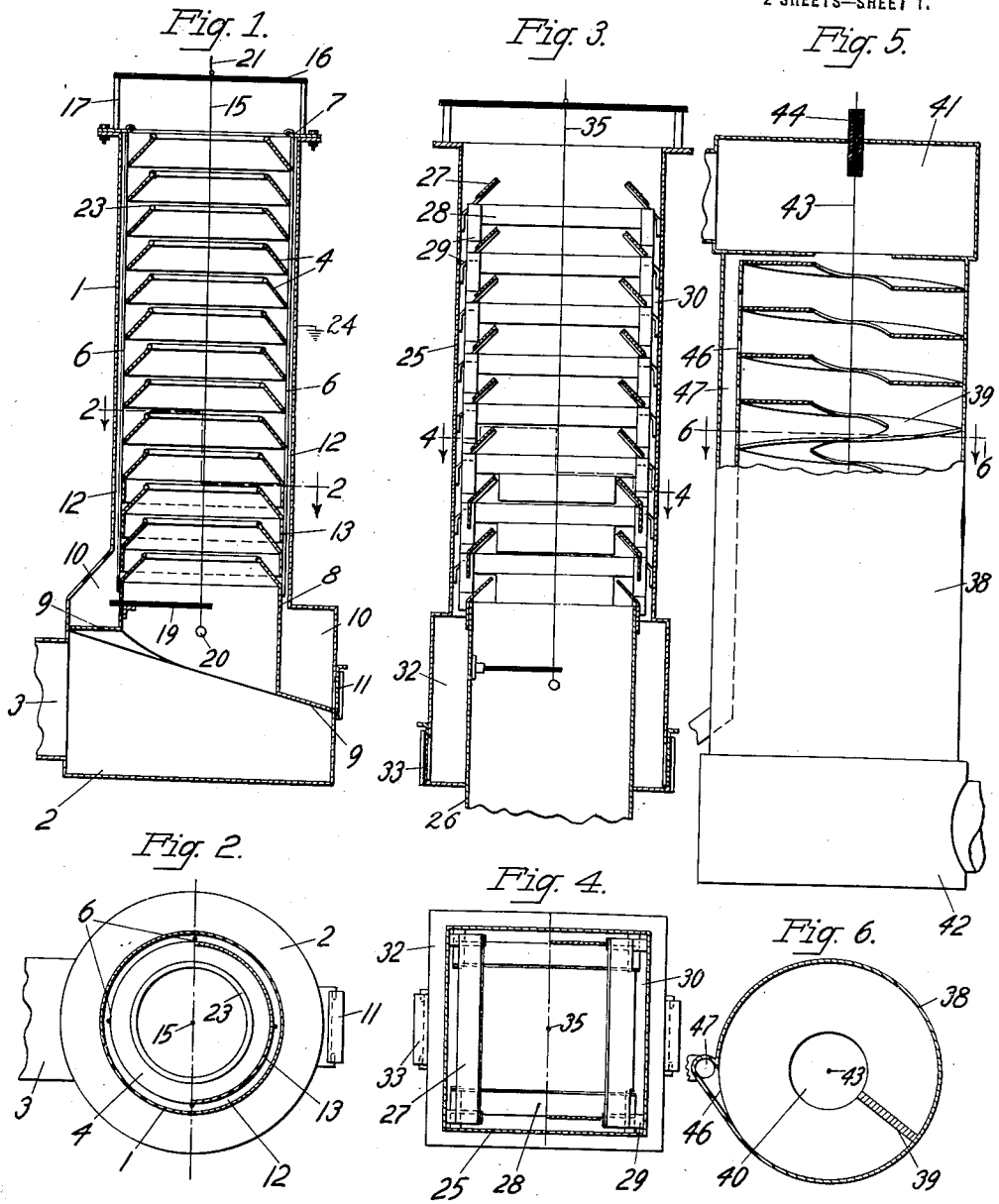

UNITED STATES PATENT OFFICE.

EDSON RAY WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

ART OF SEPARATING SUSPENDED PARTICLES FROM GASES.

1,383,586. Specification of Letters Patent. Patented July 5, 1921.

Application filed August 27, 1917. Serial No. 188,461.

*To all whom it may concern:*

Be it known that I, EDSON RAY WOLCOTT, a citizen of the United States, residing at Los Angeles, in the county of Los Angeles and State of California, have invented new and useful Improvements in the Art of Separating Suspended Particles from Gases, of which the following is a specification.

This invention relates to the art of treating gases containing dust or fume for the purpose of removing such dust or fume therefrom by the action of an electrical field. Electrical precipitation apparatus in general use comprises discharge electrodes and receiving electrodes and means for supplying high tension unidirectional electric current to said electrodes in such manner that the electric discharge takes place mainly from the discharge electrodes, and the suspended material is deposited mainly on the receiving electrodes. In apparatus of this character, the precipitated or separated material collects or accumulates upon the receiving electrodes of the apparatus and this accumulated material has to be removed from time to time, such removal requiring special apparatus and also generally involving stoppage of precipitation while the collected material is being removed. Moreover, the presence of such accumulated deposits on electrodes of the apparatus interferes seriously in some cases with the proper operation of the apparatus under certain conditions. Certain materials, particularly non-conducting dust or fume, when deposited on the receiving electrodes, tend to lower the voltage that can be maintained between the discharge and receiving electrodes and consequently decrease the efficiency of precipitation and such non-conducting deposits also tend to reduce the amount of current flowing through the apparatus in even greater proportion than the reduction in voltage, so that the economical and successful operation of the apparatus is seriously interfered with when any considerable amount of such deposits is accumulated on the collecting electrodes.

The main object of the present invention is to provide an electrical precipitating apparatus in which the electrode surfaces are kept continually clean by the internal forces—for example, the action of the electrical field itself, or the electric windage, or the action of the draft, or gravity, etc., and maximum efficiency of precipitation can therefore be maintained. Another object of the invention is to make the apparatus self cleaning so that special cleaning devices are not needed, and the apparatus can be operated continuously without shutting down for cleaning, and such operation can be effected under the most favorable conditions of voltage and current without interference from any deposit.

Another object of my invention is to provide for immediately removing the deposited material from the path of the gas stream from which it has been translated by electrical action, so as to prevent the material when once deposited, from being taken up again by the gas.

Another important object of my invention is to provide for so precipitating the suspended material from the gases that it will not disturb the electrical conditions and thereby interfere with successful precipitation.

An essential feature of the present invention is the provision of an electrical field of such strength and character as to effect the required ionization of the gas and charging and translation of the fume or dust particles, and also the provision for reception of the particles so translated into a zone or zones of minimum field strength, whereby the presence of such particles in the receiving zone will not materially disturb the effective electrical field.

Another important feature of my invention is the provision, in connection with a discharge electrode, of one or more opposing electrode portions adapted for production, between such portions and the discharge electrode, of an electrical field of sufficient strength to cause the particles of fume or dust to be forcibly translated from such opposing electrode portion by reason of the violence of the electrical windage or other electrical action adjacent thereto, and the further provision of one or more electrode portions providing a relatively weak field space for receiving the particles so translated from stronger field portions. My invention further provides for continual removal of the precipitated particles from such weaker field portions, and in this connection, the minimum field strength in the electrode portions at such parts of the field is of importance in facilitating such removal, the adherence of the particles to the electrode surfaces being so slight as to permit of continual removal by the action of gravity or of air currents set up by electrical action, or any mechanical vibration which may be present, or otherwise.

Another important feature of my invention is the construction and spacing of a plurality of electrode portions opposing a discharge electrode in such manner as to produce spaced apart relatively strong field portions in which the strength of field adjacent to such electrode portions is controlled and limited by reason of the proximity of other electrode portions, and also in such manner that the field intensity in zones between such electrode portions is reduced to a minimum value, but is sufficient to complete the precipitating action initiated by the relatively strong field portions.

Another important feature of the invention is the provision, in the path of the gas stream or successive relatively strong field portions alternating with relatively weak field portions, so that precipitating movements will be imparted to the suspended particles in such relatively strong field portions, and as the gases pass from such strong field portions into the relatively weak field portions, the movements so initiated, aided by the action of the field in such portions, will complete the precipitation operation in such relatively weak field portion and out of the zones of strong electrical action.

Accompanying drawings illustrate embodiments of my invention, and referring thereto:

Figure 1 is a vertical section of one form of the invention adapted for use with a round or cylindrical treater flue.

Fig. 2 is a section on line 2—2 in Fig. 1.

Fig. 3 is a vertical section of another form of the invention adapted for use with a rectangular treater flue.

Fig. 4 is a section on line 4—4 in Fig. 3.

Fig. 5 is a vertical section of another form of the invention, partly in elevation.

Fig. 6 is a section on line 6—6 in Fig. 5.

Fig. 7 is a vertical section of a form of the invention adapted for use with a horizontal treater flue.

Fig. 8 is a horizontal section on line 8—8 in Fig. 7.

Fig. 9 is a partial vertical section on line 9—9 in Fig. 7.

Fig. 10 is a horizontal section of a modified form of treater.

In the embodiment of my invention shown in Figs. 1 and 2, the treater or precipitating apparatus comprises a vertical flue or pipe 1, which may be cylindrical in shape, and is connected, for example, at its lower end, to means for supplying gas thereto, said means comprising a header or box 2, communicating with the lower end of the flue 1, and a flue or supply pipe 3 connected to said header. A plurality or series of receiving electrode members 4 are provided within the flue 1, said electrode members being shown as rings of sheet metal, frusto-conical in shape, so that the surface of each ring inclines outwardly and downwardly. Said rings are supported in any suitable manner—for example, they may, as shown in Figs. 1 and 2, be hung on wires 6, which are soldered or otherwise fastened to said rings, and are connected at their upper ends to supports 7 and at their lower ends to a bottom member 8. Said bottom member is shown as a ring formed as a downward extension from the lowermost ring 4, and connected to the wall of box or header 2 by a partition 9, said partition forming a floor for a dust receiving chamber 10 above the box 2, and said partition being preferably inclined so as to cause the collected material to gravitate to a door or discharge gate 11 at one side of said chamber 10. The outer edges of the annular electrode members or rings 4 are spaced from the cylindrical wall of the flue 1 so as to leave a channel 12 through which the material may descend to the chamber 10.

The size, number and spacing of these electrode members 4 will depend on the conditions of practice. It is, however, desirable to arrange said electrode members so that their outer edge will be as close to the wall of flue 1 as is consistent with free passage of the deposited material, so as to minimize the liability of upward draft of gases through this space. To further reduce this draft, any desired number of said electrode members may be provided with downward extending flanges or aprons 13 at their outer edges, leaving just sufficient space between the lower edges of said aprons and the next lower electrode member to permit passage of deposited dust.

A discharge electrode 15, formed, for example, as a fine wire, is mounted axially within the series of electrode members 4, said discharge electrode 15 being, for example, mounted on an insulating bar 16, extending over the flue 1, and mounted on supports 17 said discharge electrode being retained in position at its lower end by insulating bar 19. Suitable means, such as weight 20, is provided for tensioning the discharge electrode 15, if necessary.

Suitable means are provided for supplying high tension current to the electrodes above described. For this purpose, the discharge electrode 15 may be connected to a source of high potential by a wire indicated at 21, said wire leading, for example, to a rectifier supplied from a high tension transformer in the manner shown in patent to F. G. Cottrell, No. 895,729, dated August 11, 1908. The receiving electrodes may be grounded as indicated at 24.

The operation of the apparatus above described is as follows:—

The gas to be treated, containing fume or dust, is passed from flue 3 and box 2 into the lower end of flue 1, and ascends in said flue, being discharged at the upper end of said flue, either into the atmosphere, or into suitable flue means for carrying it to a stack, for example. A current of sufficiently high potential difference is applied to the electrodes 15 and 4 to cause electric discharge from electrode 15 in the form of corona or a silent discharge, with the result that the particles suspended in the gas are translated or forced, by electrical action, outwardly and toward and against the receiving electrodes 4 and the windage or electric convection, due to the electrical field or discharge from the electrode 15, is sufficient to drive the particles into the space between the electrode members 4. The electric field developed in this apparatus is mainly between the discharge electrode 15 and the receiving electrodes 4, and is stronger near those parts of the receiving electrodes which are closer to the discharge electrode and is comparatively weak at the parts of the receiving electrodes which are more remote from the discharge electrodes so that when the particles, which have received a charge by the action of the discharge from the discharge electrode, are driven into the space between the receiving electrodes, they enter a field space which is comparatively weak. Under these conditions, the particles entering these comparatively weak field spaces, and striking against the receiving electrodes do not adhere, with any great force, and are easily driven by the electric windage, and by their own momentum, and by the action of gravity to the outer edges of the electrode members 4, in which they fall through channel 12 into the dust collecting chamber 10.

In this connection, it will be understood that the gas in channel 12, and in dust collecting chamber 10, is comparatively quiescent, being out of the normal path and flow of the gas passing through the treater. It is essential that as far as possible, minimum space should be presented flatwise to the discharge electrode so as to reduce to a minimum, the liability of direct impingement of particles perpendicularly against a receiving surface, as such impingement would be liable to lead to adherent or permanent deposit, requiring special cleaning. On the other hand, it is also essential that the edges of the receiving electrodes 4, which are opposed to the discharge electrode, should not be so sharp as to produce a field concentration sufficient to lead to back ionization from these receiving electrodes, as this would result in migration or travel of the dust particles away from said electrodes 4, whereas, it is necessary that all the travel of the dust particles should be, as far as possible, in the direction toward the receiving electrodes. In order to prevent any such back ionization, the inner edges of receiving electrodes may be rounded or beaded as shown at 23. It is also desirable that the receiving electrodes 4 should be spaced with sufficient closeness and should be of sufficient width between their inner and outer edges to insure that the outer portions next to the inclosing wall present a weak electric field so that precipitation by direct action of the field will take place on these electrodes and not on the surrounding wall.

In applying my invention to a square or rectangular treater flue, the construction shown in Figs. 3 and 4 may be adopted. In these figures, the treater flue is shown as a vertical rectangular tube 25, which may be open at the top, or may be connected to suitable means for carrying off the gases, and is shown as connected at its lower end to the top of the stack or flue 26. The receiving electrodes in this case, are shown as consisting of plates or strips 27 and 28, mounted by brackets 29 on the respective sides of the treater flue 25 in such manner as to leave spaces 30 between the wall of treater 25 and the adjacent edges of these plates. In order to enable these plates to extend as nearly as possible, the complete width of the treater flue, they are overlapped as shown, the plates 27 mounted on two opposite sides of the treater flue being alternated with the plates 28 mounted on the other two opposite sides of said flue. Said plates 27 and 28, constituting the receiving electrodes, are inclined downwardly and outwardly with respect to the vertical axis of the flue so that the material deposited thereon, or impinging thereagainst, will travel downwardly and outwardly and fall through the spaces 30 into a dust collecting box 32 at the bottom of the flue, said box having suitable discharge means 33. The discharge electrode 35, in this case, is shown as of similar construction and mounting to the discharge electrode above described, and the operation of the apparatus is substantially the same as that in the form shown in Figs. 1 and 2.

In the form of my invention shown in Figs. 5 and 6, the flue casing indicated at 38, is cylindrical, and the receiving electrode means consists of a helical plate or laminar flange 39, extending around the central passage 40 through which the gas is conducted between headers or inlet and outlet chambers 41 and 42. The discharge electrode 43 is mounted axially in said central passage, being suspended, for example, from an insulator 44. This arrangement of the flange 39 leads to a spiral or vortical motion of the gas in passing through the device, with the result that the fume or dust particles which are forced toward the outer wall of the device by the action of the electrical field, are caused to travel along the helical flange and in case of a downdraft arrangement of the inlet and outlet flues may be caused to travel into the lower header. Or, if required, one or more lateral outlets 46 may be provided in the casing 39, through which the precipitated material passes into a chute 47 for conducting it to suitable receiving means. In this form of my invention, the material precipitated on to the receiving electrodes is caused to travel outwardly in the spaces between the convolutions of the helix, by the electrical force of the electrical field, by the electrical windage due to such field, and by the vortical motion of the gas. If required, the laminar helical member 39 may be inclined outwardly toward the wall of the casing, so as to enable the outward travel of the precipitated material toward the discharge chute 47, to be aided by gravity.

My invention may also be applied in connection with electrical precipitators of the "plate" type. For example, as shown in Fig. 7, the gas may be passed through a casing 50 in which plates 51, constituting receiving electrodes, are hung in rows, from suitable supports, the plates extending transversely to the direction of the rows, and the discharge electrodes 52, formed, for example, as vertical wires, are hung from an insulated support 53. These discharge electrodes may be arranged opposite the spaces between plates 51 as shown in Figs. 7 and 8, or they may be arranged opposite the edges of the plates, as shown in Fig. 10. The receiving electrodes are grounded, as indicated at 55 and the discharge electrodes are connected through wire 54 to a suitable source of unidirectional-high tension current, so as to produce relatively strong field zones between the wires and the edges of the plate electrodes, and relatively weak fields in the spaces between the plates. By properly proportioning and arranging the parts and maintaining a suitable voltage between the electrodes, the electrical field and the electrical and mechanical actions resulting therefrom may be made so intense at the edges of the plates as to cause more or less of the precipitated material to be forced away from such edges and into the relatively weak field zones between the receiving electrode plates 51, in which zones the electric particles may accumulate or may descend by the action of gravity, to the bottom of the spaces between said plates, being there received in suitable bins 56 and removed in any suitable manner. The casing 50 is shown as provided with inlet flue 57 and outlet flue 58 adapted to pass the current of gas horizontally between the wires of plates 51, this construction having the advantage that the spaces between said plates are zones of minimum gas flow as well as minimum field, thereby conducing to settlement of the suspended material forced thereinto from the stronger field zone.

If desired, however, the inlet and outlet means may be connected to casing 50 in such manner as to pass the gas stream horizontally, and parallel to the plates 51, or vertically upward or downward.

In the several embodiments of my invention above described, the action of the strong electric field between the discharge electrodes and the adjacent edges of the receiving electrode plates, produces considerable electrical windage or convection currents, tending to blow the deposit from said edges into the spaces between the receiving electrode plates. Moreover, the intensification of the electric field adjacent to such edges tends to produce more or less ionization of a sign opposite to that produced by the discharge electrode. Therefore, in the case, for example, when the discharge electrodes are maintained at high negative potential, and the receiving electrodes are grounded, the particles which have been, negatively charged by ionizing action at the discharge electrode, and are forced toward the adjacent edges of the receiving electrode, (charged positively by induction from the discharge electrode,) may, to a large extent, have their charges neutralized, or even reversed, by action of the reverse ionization at such edges, with the result that such particles fail to reach the surface when such intensified field is produced and are carried past such portions, by the entraining action of the gas stream, by electrical windage, and by the action of gravity, or by any one of such actions, and such particles as they pass into the weaker field zones between the plates 51, may accumulate in such zones without materially disturbing the electrical conditions, the field in such zones not being of sufficient strength to develop any considerable amount of ionization. The weakness of the field in these zones is also of advantage in that it reduces the tendency of the receiving electrode to retain the precipitated material, either by electrical action or by the mechanical adherence due to violence of impact under strong electrical field, such weak field enabling the material to be readily dislodged and carried away from the plates by gravity, assisted by the action of the gas stream, by centrifugal action, or by electrical windage, or by a combination of such actions. These zones of minimum field strength constitute, in fact, non-retentive receiving zones, through which the material is forced by the actions referred to, to the outlet means for such material.

Another feature of the several embodiments of my invention above described, where the gas stream moves successively past a series of electrode members, spaced apart so that the field is intensified adjacent to such members and is minimized in the intervening spaces, is that when the particles have been set in motion by the strong electrical actions in any intensified field zone, the motion of the gas stream carries the particles into the weaker field zones where they are collected and removed without disturbing the conditions in the relatively strong field zones.

Even in case the suspended material, translated into the weaker field zones by the electrical actions in the intensified field zones, is not immediately removed, but is deposited in the weak field zones to a greater or less extent, the fact that it is collected in a zone of weak field intensity is of advantage, in that the field adjacent to the deposit is not of sufficient strength to develop any material amount of "back ionization" in or adjacent to such deposit, and there is, therefore, no liability of the deposit giving rise to undesirable field conditions, such as would, for example, lead to lowering of the potential difference that can be maintained between the electrodes.

What I claim is:

1. Apparatus for separating suspended particles from gases, comprising a receiving electrode having portions with open spaces therebetween, said portions extending transversely of the gas flow and defining a gas passage, discharge electrode means extending into said gas passage, and means for producing an electric stress between said electrodes sufficient to cause the suspended particles to enter the spaces between said portions, said receiving electrode portions being of such dimensions and spacing relative to one another and to the discharge electrode as to enable strong electric fields to be produced between the discharge electrode and the several receiving electrode portions, while producing a weak field in the spaces between said portions.

2. Apparatus for separating suspended particles from gases, comprising a casing provided with inlet and outlet for the gases, a receiving electrode in said casing, having portions with open spaces therebetween, said portions extending transversely of the gas flow and defining a gas passage, a discharge electrode extending into said gas passage and means for producing an electric stress between said electrodes sufficient to cause the suspended particles to enter the spaces between said portions, said portions of the receiving electrode extending sufficiently close to the discharge electrode and being spaced sufficiently close together to substantially concentrate the electric field in zones between the discharge electrode and the said portions and to form zones of weak field strength in the spaces between said zones of strong electric field.

3. Apparatus for separating suspended particles from gases, comprising a casing provided with inlet and outlet for the gases, a receiving electrode in said casing, having portions with open spaces therebetween, said portions extending transversely of the gas flow and defining a gas passage, a discharge electrode extending into said gas passage, means for producing an electric stress between said electrodes sufficient to cause the suspended particles to enter the spaces between said portions, said spaces extending a sufficient distance from the discharge electrode to approximately nullify the electric field in the outer portions of said spaces, and means within the casing in communication with said spaces for receiving the material from said spaces.

4. An electrical precipitator comprising discharge electrode means, means for conducting a stream of gas past said discharge electrode means, receiving electrode members with open spaces therebetween, said members extending transversely of and defining the gas stream and spaced from the discharge electrode, means to provide a series of strong electrical field zones adjacent to said receiving electrode members, alternating with a series of weak electrical field zones at the spaces between said receiving electrode members, and outlet means for precipitated material, communicating unobstructedly with said spaces between the receiving electrode members, to receive the precipitated material passing outwardly in said spaces.

5. An apparatus, according to claim 4, wherein the receiving electrode members are inclined downwardly and outwardly to facilitate movement of precipitated material to said outlet means.

6. In an apparatus for precipitating suspended material from gases by electrical action, a casing, a discharge electrode extending vertically within the casing, and receiving electrode plates extending within the casing and transversely to the discharge electrode, said plates being inclined downwardly toward the wall of the casing and spaced from such wall to permit precipitated material to fall through the space between the plates and the wall.

7. The method of separating suspended particles from gases, which consists in subjecting the gases to the action of a strong electrical field to cause translation of the suspended particles, receiving the translated particles in a weaker field to continue the translation into a non-retentive removing zone, and continually removing the particles from such non-retentive zone.

8. The method of separating suspended particles from gases, which consists in subjecting the gases to the action of a strong electrical field to cause translation of the suspended particles, receiving the precipitated particles in a weaker field to continue the translation into a non-retentive zone, and continually removing the particles from such non-retentive zone by the action of gravity.

In testimony whereof I have hereunto subscribed my name this 20th day of August 1917.

EDSON RAY WOLCOTT.